(12) United States Patent
Sevindik et al.

(10) Patent No.: US 11,115,845 B2
(45) Date of Patent: Sep. 7, 2021

(54) CITIZENS BROADBAND RADIO SERVICE NETWORK INTERFERENCE MANAGEMENT USING DUAL SUBSCRIBER IDENTIFICATION MODULE DEVICES

(71) Applicant: Charter Communications Operating, LLC, St. Louis, MO (US)

(72) Inventors: Volkan Sevindik, Reston, VA (US); Haider Syed, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/439,795

(22) Filed: Jun. 13, 2019

(65) Prior Publication Data
US 2020/0396624 A1    Dec. 17, 2020

(51) Int. Cl.
| | | |
|---|---|---|
| *H04W 24/08* | (2009.01) | |
| *H04W 16/14* | (2009.01) | |
| *H04W 24/10* | (2009.01) | |
| *H04W 88/06* | (2009.01) | |

(52) U.S. Cl.
CPC ........... *H04W 24/08* (2013.01); *H04W 16/14* (2013.01); *H04W 24/10* (2013.01); *H04W 88/06* (2013.01)

(58) Field of Classification Search
CPC .................................................... H04W 24/08
See application file for complete search history.

(56) References Cited

U.S. PATENT DOCUMENTS

| | | | |
|---|---|---|---|
| 2013/0059610 A1* | 3/2013 | Siomina | H04W 24/10 455/456.6 |
| 2017/0238136 A1 | 8/2017 | Smith | |
| 2018/0098238 A1* | 4/2018 | Saxena | H04W 72/085 |
| 2018/0288620 A1* | 10/2018 | Jayawickrama | H04W 72/0453 |
| 2019/0098665 A1 | 3/2019 | Chen et al. | |
| 2019/0230530 A1* | 7/2019 | Henriksson | H04W 76/11 |
| 2019/0335336 A1* | 10/2019 | Cimpu | H04W 16/14 |
| 2020/0008007 A1* | 1/2020 | Belghoul | H04W 4/021 |

FOREIGN PATENT DOCUMENTS

| | | | | |
|---|---|---|---|---|
| WO | 2018226538 A1 | 12/2018 | | |
| WO | WO2020070716 A1 * | 4/2020 | | H04W 16/14 |

\* cited by examiner

*Primary Examiner* — Edan Orgad
*Assistant Examiner* — Won Tae C Kim
(74) *Attorney, Agent, or Firm* — Young Basile Hanlon & MacFarlane, P.C.

(57) ABSTRACT

Methods and systems for citizens broadband radio service (CBRS) interference management using dual subscriber identification module (SIM) devices are described. The method includes assigning a physical cell identity (PCI) to each CBRS device (CBSD) granted unlicensed spectrum by a spectrum access system (SAS). Each spectrum granted CBSD may exchange PCIs with neighbor spectrum granted CBSDs to resolve PCIs and maintains a PCI table. A dual SIM device may be connected to a CBSD via a first SIM. Each spectrum granted CBSD having a connected dual SIM device reports a number of PCIs detected by the dual SIM device(s). A SAS designated dual SIM device may use a second SIM to measure power values of PCIs detected by the designated dual SIM device which are absent from a provided PCI table. The measured power values may be used by the SAS to make cluster interference decisions.

20 Claims, 9 Drawing Sheets

CITIZENS BROADBAND RADIO SERVICE NETWORK INTERFERENCE MANAGEMENT USING DUAL SUBSCRIBER IDENTIFICATION MODULE DEVICES

TECHNICAL FIELD

This disclosure relates to wireless communications. More specifically, this disclosure relates to managing interference in Citizens Broadband Radio Service systems.

BACKGROUND

Wireless telecommunications or radio access technologies (RATs) generally use licensed radio frequency spectrum for communications between mobile devices and wireless telecommunications networks. For example, licensed spectrum is used for third generation (3G) and fourth generation (4G) wireless communications. Wireless telecommunications technologies may also use unlicensed spectrum.

Citizens Broadband Radio Service (CBRS) spectrum is a type of unlicensed spectrum which is shared between multiple entities including government users (such as the military), licensed users, and non-licensed users. CBRS is a multi-tiered wireless band between 3.550 MHz and 3.700 MHz. In particular, CBRS is a three-tiered access framework including incumbent users (i.e., federal, military, and the like), priority access users (winning auction bidders), and general authorized access users, where the general users are permitted to use any portion of the CBRS spectrum not assigned to a higher tier user and may also operate opportunistically on unused priority access spectrum. Availability of CBRS spectrum dynamically changes depending on use by higher priority entities. Higher tier users are protected from lower tier users using a centralized spectrum access system (SAS), which may be a federal or commercial entity. The SAS authorizes or grants spectrum to access points known as CBRS Devices (CBSDs) and performs interference management to protect higher tier users. This protection may include, for example, dropping CBSDs which are general authorized access users.

As inferred, CBRS is an interference limited network which means that the performance of the network and the data sent to CBRS subscribers is limited by the amount of interference the CBRS users or subscribers experience in the frequency band of operation. Currently, the SAS performs interference management by using propagation and pathless models and analysis to determine that interference levels at a location are below an interference threshold. However, this does not represent the real interference experienced in the CBRS spectrum by the network. As a result, CBRS users or subscribers may be detrimentally affected by being dropped or rate restricted.

SUMMARY

Disclosed herein are methods and systems for citizens broadband radio service (CBRS) network interference management using dual subscriber identification module (SIM) devices. In an implementation, the method includes assigning a physical cell identity (PCI) to each connected Citizens Broadband Radio Service (CBRS) device (CBSD) granted unlicensed spectrum by a spectrum access system (SAS), where multiple clusters are formed containing different spectrum granted CBSDs. Each of the spectrum granted CBSDs may exchange PCIs with neighbor spectrum granted CBSDs for a defined period of time to resolve PCI information and each CBSD maintains a PCI table. A dual SIM device may be connected to a CBSD via a first SIM device in a dual SIM device. Each spectrum granted CBSD having a connected dual SIM device reports a number of PCIs detected by the dual SIM device(s). A SAS designated dual SIM device may use a second SIM device to measure power values of PCIs detected by the designated dual SIM device which are absent from a PCI table provided an associated spectrum granted CBSD. The measured power values may be reported to the SAS, which in turn may make cluster interference decisions based on the measured power values.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
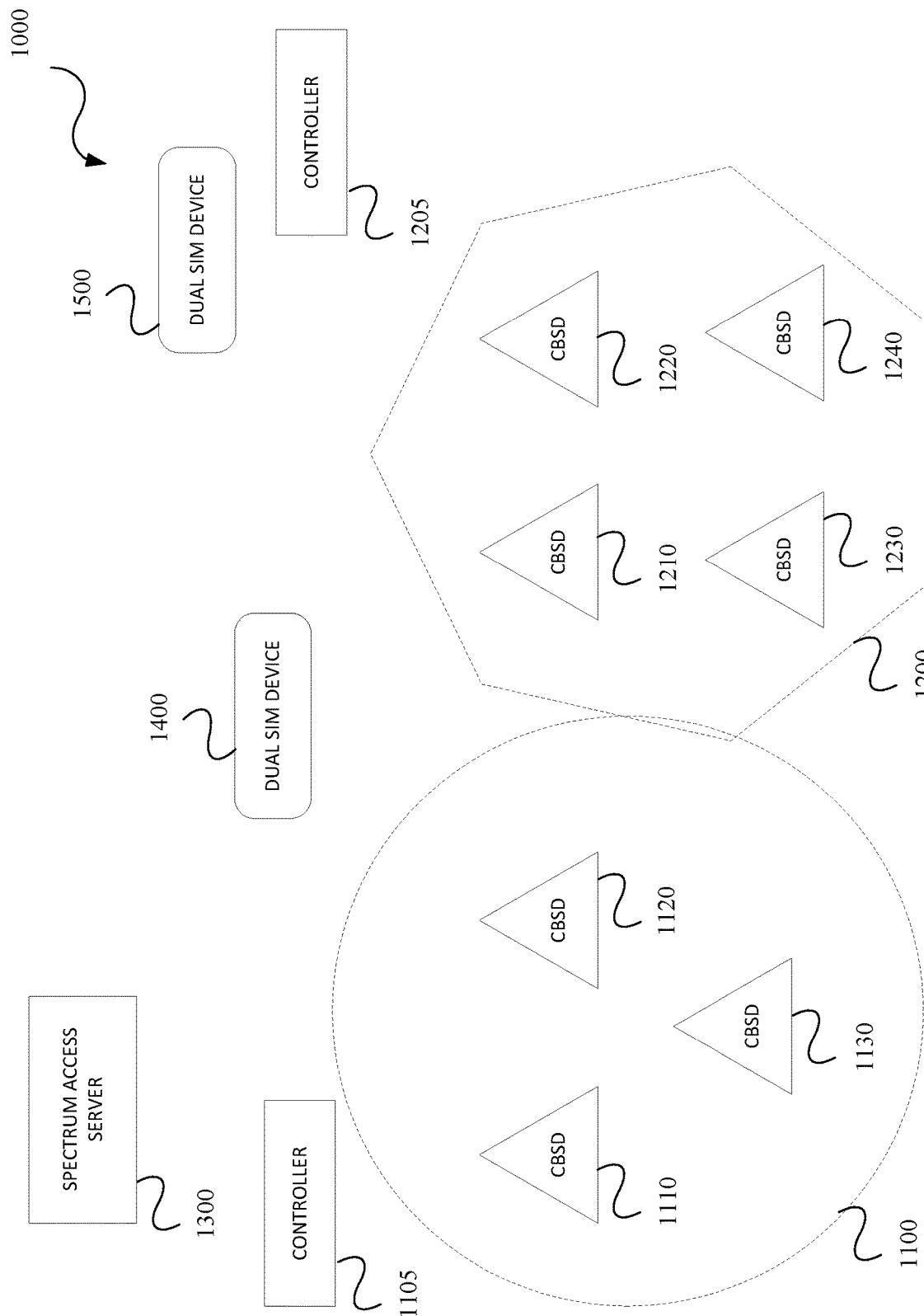
FIG. 1 is a diagram of an example of a citizens broadband radio service (CBRS) network with dual subscriber identification module (SIM) devices in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein are methods, devices, and systems for citizens broadband radio service (CBRS) network interference management using dual subscriber identification module (SIM) devices. A spectrum access system (SAS) is provided with actual measurements to estimate interference for a given location in the CBRS network. The propagation and pathless models used by the SAS may not reflect the true interference environment. The method may improve user experience when using the CBRS spectrum for connectivity and communications. For example, this may prevent a user from being disconnected.

In an implementation, the dual SIMs in a dual SIM device may be used for both data communications or user traffic and for taking measurement data. The measurement data may be provided to an appropriate CBRS Device (CBSD), which in turn may forward the measurement data to the SAS. The SAS may then determine the interference environment. Since the interference environment is based on real measurement data, interference management decisions by the SAS may be more granular.

In an implementation, SAS spectrum granted CBSDs may be organized as clusters and may provide spectrum coverage for a geographic location. Each CBSD may have one or more sectors and each sector may be associated with a physical cell identity (PCI). One SIM of a dual SIM device may be connected to a CBSD via a sector for data communications. The dual SIM device may inform the CBSD how many PCIs are detected by the dual SIM device. Each CBSD with a connected dual SIM device may then provide the number of detected PCIs to the SAS. The SAS may then select a dual SIM device for each CBSD to make power measurements with respect to CBSDs outside its cluster, inside its cluster, and/or both using the second SIM of the dual SIM device. Since the dual SIM device is moving, the SAS may use the power measurement data to make an interference map and mitigate chances of deallocating spectrum to the CBSD.

In an implementation, selection of which dual SIM device to make the power measurements may be based on a variety of factors. This may include, but is not limited to, number of PCIs seen by the dual SIM device, how many measurements has a particular dual SIM device made, time interval between measurements and the like. A dual SIM device may be limited to how often it is selected or makes measurements to avoid draining the power of the dual SIM device.

In an implementation, SAS spectrum granted CBSDs may exchange PCIs with neighbor CBSDs to decrease PCI convergence time, which is the time interval needed to make sure duplicate PCIs are not being used. Upon selection by the SAS of a selected dual SIM device for each CBSD, each CBSD may provide a PCI list to the selected dual SIM device. The selected dual SIM device may use this PCI table to determine which CBSDs and/or CBSD sectors to measure power. The PCI table may be updated when there are changes in the PCIs in a given cluster.

FIG. 1 is a diagram of an example architecture 1000 for CBRS network interference management using dual SIM devices. In an implementation, the architecture 1000 may include a first cluster 1100 which may provide wireless coverage for a first geographic location and a second cluster 1200 which may provide wireless coverage for a second geographic location. The first cluster 1100 may be controlled by a controller 1105 and the second cluster 1200 may be controlled by a controller 1205. The first cluster 1100 may include CBSDs 1110, 1120, and 1130, and the second cluster 1200 may include CBSDs 1210, 1220, 1230, and 1240. The number of clusters and the number of CBSDs is illustrative and the architecture 1000 may include more or less clusters and each cluster may include more or less CDSDs. The architecture 1000 may include a SAS 1300 which is connected to or in communication (collectively "in communication with") with each of the CBSDs 1110, 1120, 1130, 1210, 1220, 1230, and 1240. A dual SIM device 1400 and a dual SIM device 1500 may each be in communication with one of the CBSDs 1110, 1120, 1130, 1210, 1220, 1230, and 1240. The communications between the dual SIM device 1400 and the dual SIM device 1500, particular CBSDs 1110, 1120, 1130, 1210, 1220, 1230, and 1240, the SAS 1300 may include wired communications, wireless communications, or a combination thereof. In an implementation, the architecture 1000 may execute the techniques described in FIGS. 7-9. The architecture 1000 is illustrative and may include additional, fewer or different devices, entities and the like which may be similarly or differently architected without departing from the scope of the specification and claims herein. Moreover, the illustrated devices may perform other functions without departing from the scope of the specification and claims herein.

Figure 2:
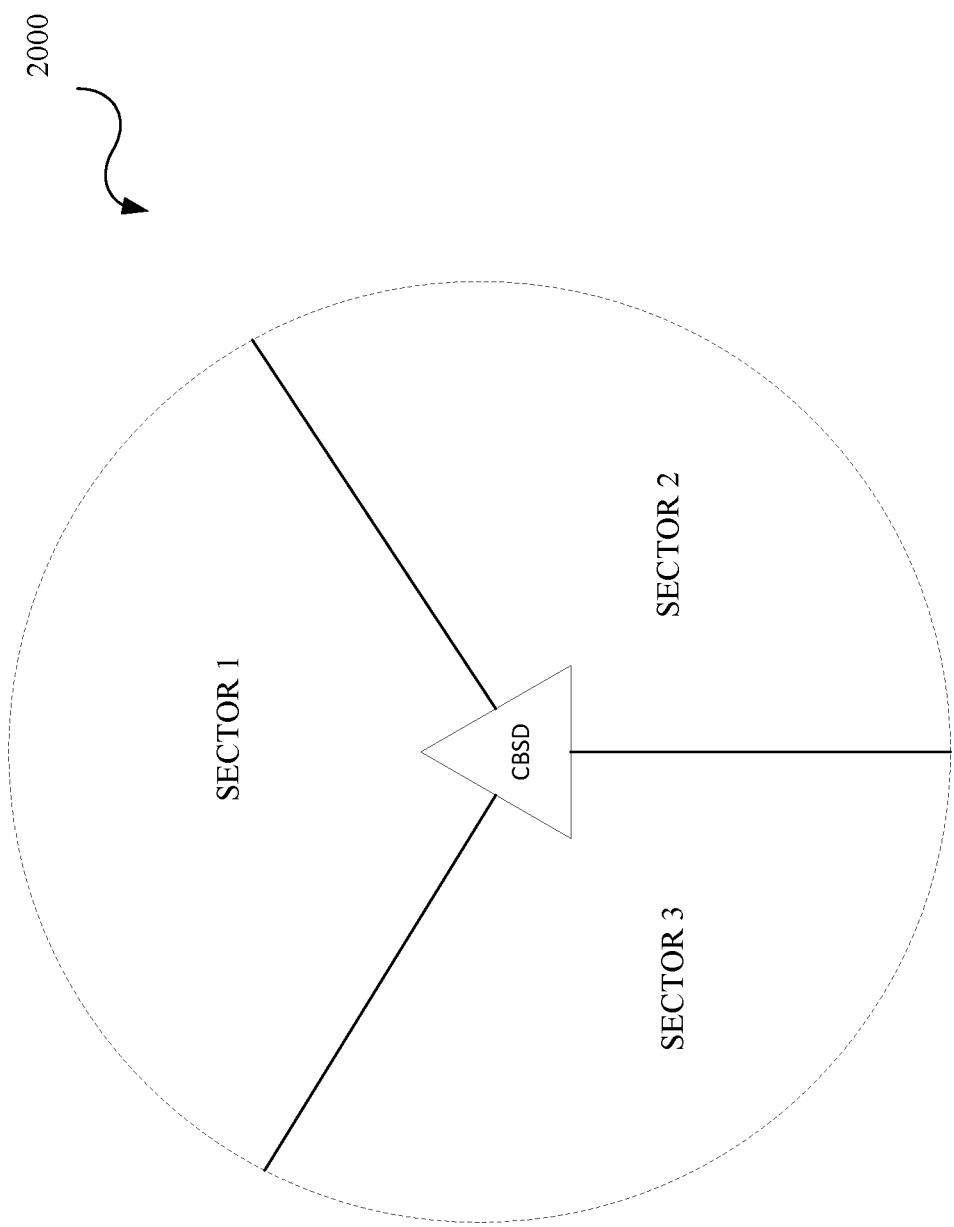
FIG. 2 is a graphical illustration of an example of a CBSD with sectors in accordance with embodiments of this disclosure.

The CBSDs 1110, 1120, 1130, 1210, 1220, 1230, and 1240 may be a base station, an access point, an access node or like device which enables radio communications access between, for example, the dual SIM device 1400 and the dual SIM device 1500 to other devices. Each CBSD 1110, 1120, 1130, 1210, 1220, 1230, and 1240 may be authorized and granted spectrum allocation by the SAS 1300 (which may be communicated via the controller 1105 or the controller 1205, for example, in implementations). Each CBSD 1110, 1120, 1130, 1210, 1220, 1230, and 1240 may have sectors which provide wireless communications coverage. For example, FIG. 2 shows a graphical illustration of an example of a CBSD 2000 with three sectors, i.e., sector 1, sector 2, and sector 3 in accordance with embodiments of this disclosure. Each sector may be identified with a physical cell identity (PCI). The number of sectors is illustrative and may vary without departing from the scope of the specification and claims described herein. Each CBSD may exchange PCI(s) with neighbor PCI(s) and maintain a table of neighbor PCI(s) as illustrated in Table 1, for example.

TABLE 1

PCI Table for CBSD

| CBSD | SECTOR 1 | SECTOR 2 | SECTOR 3 |
|---|---|---|---|
| CBSD ID: 1234 | PCI 100 | PCI 101 | PCI 102 |
| CBSD ID: AED23 | PCI 203 | PCI 204 | PCI 205 |
| CBSD ID: 000X1112 | PCI 300 | PCI 301 | PCI 302 |

In an implementation, the CBSDs 1110, 1120, 1130, 1210, 1220, 1230, and 1240 may be part of a service provider system or multiple systems operator (MSO) which provides connectivity and content to the dual SIM device 1400 and the dual SIM device 1500, for example. In an implementation, the CBSDs 1110, 1120, 1130, 1210, 1220, 1230, and 1240 may be operated via or under a mobile virtual network operator (MVNO) which provides connectivity and content to the dual SIM device 1400 and the dual SIM device 1500, for example. In an implementation, the CBSDs 1110, 1120, and 1130, and the CBSD 1210, 1220, 1230, and 1240 may be owned and operated by the same MSO or MVNO. In an implementation, the CBSDs 1110, 1120, and 1130, and the CBSD 1210, 1220, 1230, and 1240 may be owned and operated by different MSOs or MVNOs.

In an implementation, the first cluster 1100 may provide wireless coverage for a first geographic location, site, and the like. For example, the first cluster 1100 may be grouped for a venue, large building, stadium, transportation hub or station and the like. The controller 1105 may manage communications with the SAS 1300. For example, the controller 1105 may communicate power measurements, allocation commands, and deallocation commands to and from the SAS 1300. The controller 1105 may be owned and operated by the MSO, the MVNO, or a third party.

In an implementation, the second cluster 1200 may provide wireless coverage for a second geographic location, site, and the like. For example, the second cluster 1200 may be grouped for a venue, large building, stadium, transportation hub or station and the like. The controller 1205 may manage communications with the SAS 1300. For example, the controller 1205 may communicate power measurements, allocation commands, and deallocation commands to and from the SAS 1300. The controller 1205 may be owned and operated by the MSO, the MVNO, or a third party.

The dual SIM device 1400 and the dual SIM device 1500 may be, but is not limited to, end user devices, cellular telephones, Internet Protocol (IP) devices, mobile computers, laptops, handheld computers, PDAs, personal media devices, smartphones, notebooks, notepads, phablets and the like which may include two (2) SIMs and at least one radio. Each SIM of the dual SIM device 1400 and the dual SIM device 1500 may be provisioned for operation with a MSO, MVNO, or other like service provider. Each dual SIM device 1400 and the dual SIM device 1500 may therefore communicate with one SIM and perform power measurement tasks with the other SIM as described herein. A selected dual SIM device may take power measurements of PCI(s) which are not on a PCI table provided by associated CBSD. The power measurements may be Reference Signal Received Power (RSPP), Reference Signal Received Quality (RSRQ), Received Signal Strength Indicator (RSSI), or like measurement of power of a CBSD or CBSD sector associated with the PCI. The number of SIMS is illustrative and may be more than 2 without departing from the scope of the specification and claims described herein.

The SAS 1300 enables access to the CBRS spectrum and dynamically manages the spectrum for optimal use, efficiency, and compliance with CBRS rules. The SAS 1300 communicates with each CBSD for registration, grant allocation/deallocation and interference management. The SAS 1300 may perform interference analysis based on the power measurements received from the selected dual SIM device(s). In an implementation, the amount of interference may be determined using median, average, high, low, or other metrics using the power measurements received from the selected dual SIM device(s). In an implementation, an interference table or pattern may be generated by the SAS as the selected dual SIM device(s) move with respect to the CBSD. In an implementation, the SAS may make allocation and deallocation decisions based on the interference table or pattern. For example, the SAS 1300 may use reported amount of RSRP and RSSI values at certain times and location in the network. The SAS 1300 may calculate average RSRP and RSSI values, and/or standard deviations of the RSRP and RSSI values using time reported values at certain locations. The SAS 1300 may predict interference values at locations in the network using average±standard deviation values reported by the dual SIM device 1400, for example. In an implementation, network location may be defined by a 10×10 meter square or squares of any size. In an implementation, interference may be determined as RSSI-RSRP. The SAS 1300 may be operated be a commercial, federal entity, or some combination thereof. In an implementation, the interference analysis may be inter-cluster interference, intra-cluster interference, and/or combinations thereof.

Operationally, and as described in detail herein below, the SAS 1300 may grant spectrum to each activated CBSD, such as the CBSDs 1110, 1120, 1130, 1210, 1220, 1230, and 1240. In an implementation, the communication may be via the controller 1105 and the controller 1205. Each CBSD or sector of the CBSDs 1110, 1120, 1130, 1210, 1220, 1230, and 1240 may be provided with or designated a PCI. The CBSDs 1110, 1120, 1130, 1210, 1220, 1230, and 1240 may exchange the PCIs with neighbor CBSDs until PCI designation is stable, i.e., there are no duplicate or overlapping PCIs. Each CBSD may maintain a PCI table.

A dual SIM device, i.e., the dual SIM device 1400 and the dual SIM device 1500, which is connected to a CBSD via one SIM, may report to the CBSD the number of PCIs that the connected dual SIM device detects. The number of detected PCIs is then reported to the SAS 1300 (via controller 1105 and/or 1205 in an implementation). In an implementation, the SAS 1300 may select the dual SIM device which has detected the highest number of PCIs for a given cluster (which may be denoted as environmental sensing with dual SIM device (ESDSD) to measure the power from CBSDs not in the CBSD's cluster. This may be accomplished by having the CBSD of the ESDSD provide the ESDSD with the PCI table of neighbor PCIs. The ESDSD (using the SIM that is not being used for data communications or traffic) may measure the power from CBSDs that are outside the cluster, inside the cluster, and/or both. For example, if the dual SIM device 1400 was connected to CBSD 1120 in the first cluster 1100 and was selected as the ESDSD, the dual SIM device 1400 may measure the power from PCIs in the second cluster 1200. The measurements may then be reported to the SAS 1300 via the CBSD (and via a controller as appropriate).

The SAS 1300 may then determine the inter-cluster interference, intra-cluster interference, and/or both and make decisions with respect to spectrum allocations/deallocations and the like. In an implementation, the SAS 1300 may be able to make an interference map based on the movements or mobility of the ESDSD. This may be used to make the spectrum allocations/deallocations decisions on a more granular or in a more refined manner. In an implementation, the ESDSD may be updated with changes in the PCIs. In an implementation, the ESDSD may take measurements at defined intervals, as requested by the SAS 1300, or a combination thereof. The ESDSD may be changed after a defined period so as not to drain the battery of the ESDSD. In an implementation, other techniques may be used to select the ESDSD. For example, a set of the dual SIM devices detecting the highest number of PCIs may be used on a rotating basis to prevent battery drainage.

Figure 3:
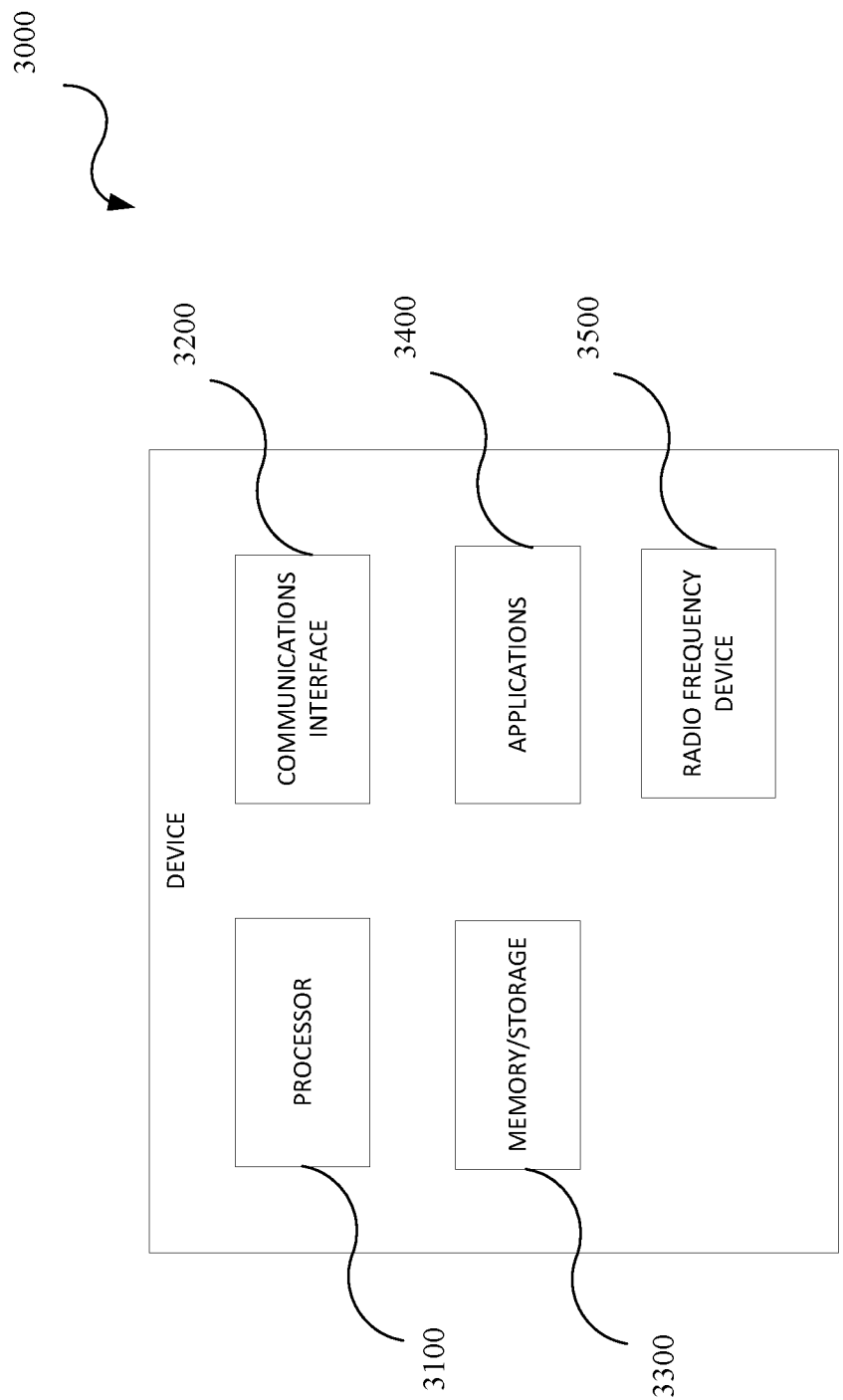
FIG. 3 is a block diagram of an example of a CBRS device (CBSD) in accordance with embodiments of this disclosure.

FIG. 3 is a block diagram of an example of a device 3000 in accordance with embodiments of this disclosure. The device 3000 may include, but is not limited to, a processor 3100, a memory/storage 3200, a communication interface 3300, applications 3400, and a radio frequency device 3500. The device 3000 may include or implement, for example, any of the CBSDs 1110, 1120, 1130, 1210, 1220, 1230, and 1240. In an implementation, the memory/storage 3200 may store the PCI table. The applicable or appropriate CBRS network interference management using dual SIM devices techniques or methods described herein may be stored in the memory/storage 3200 and executed by the processor 3100 in cooperation with the memory/storage 3200, the communications interface 3300, the applications 3400, and the radio frequency device 3500 as appropriate. The device 3000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 4:
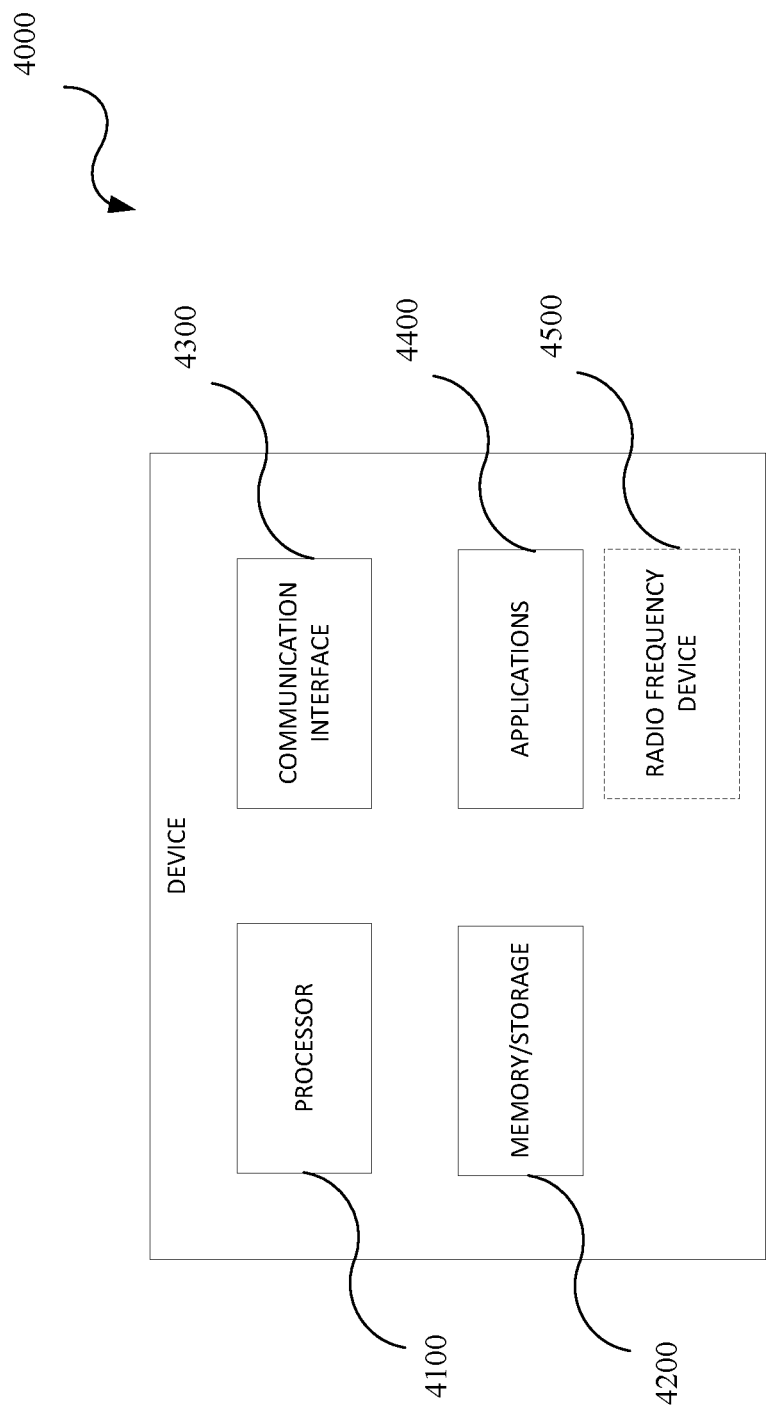
FIG. 4 is a block diagram of an example of a device in accordance with embodiments of this disclosure.

FIG. 4 is a block diagram of an example of a device 4000 in accordance with embodiments of this disclosure. The device 4000 may include, but is not limited to, a processor 4100, a memory/storage 4200, a communication interface 4300, and applications 4400. In an implementation, the device 4000 may include a radio frequency device 4500. The device 4000 may include or implement, for example, the controller 1105, the controller 1205, and the SAS 1300. In an implementation, the memory/storage 4200 may store the interference map, spectrum allocations, and other information. The applicable or appropriate CBRS network interference management using dual SIM devices techniques or methods described herein may be stored in the memory/storage 4200 and executed by the processor 4100 in cooperation with the memory/storage 4200, the communications interface 4300, the applications 4400, and the radio frequency device 4500 (when applicable) as appropriate. The device 4000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 5:
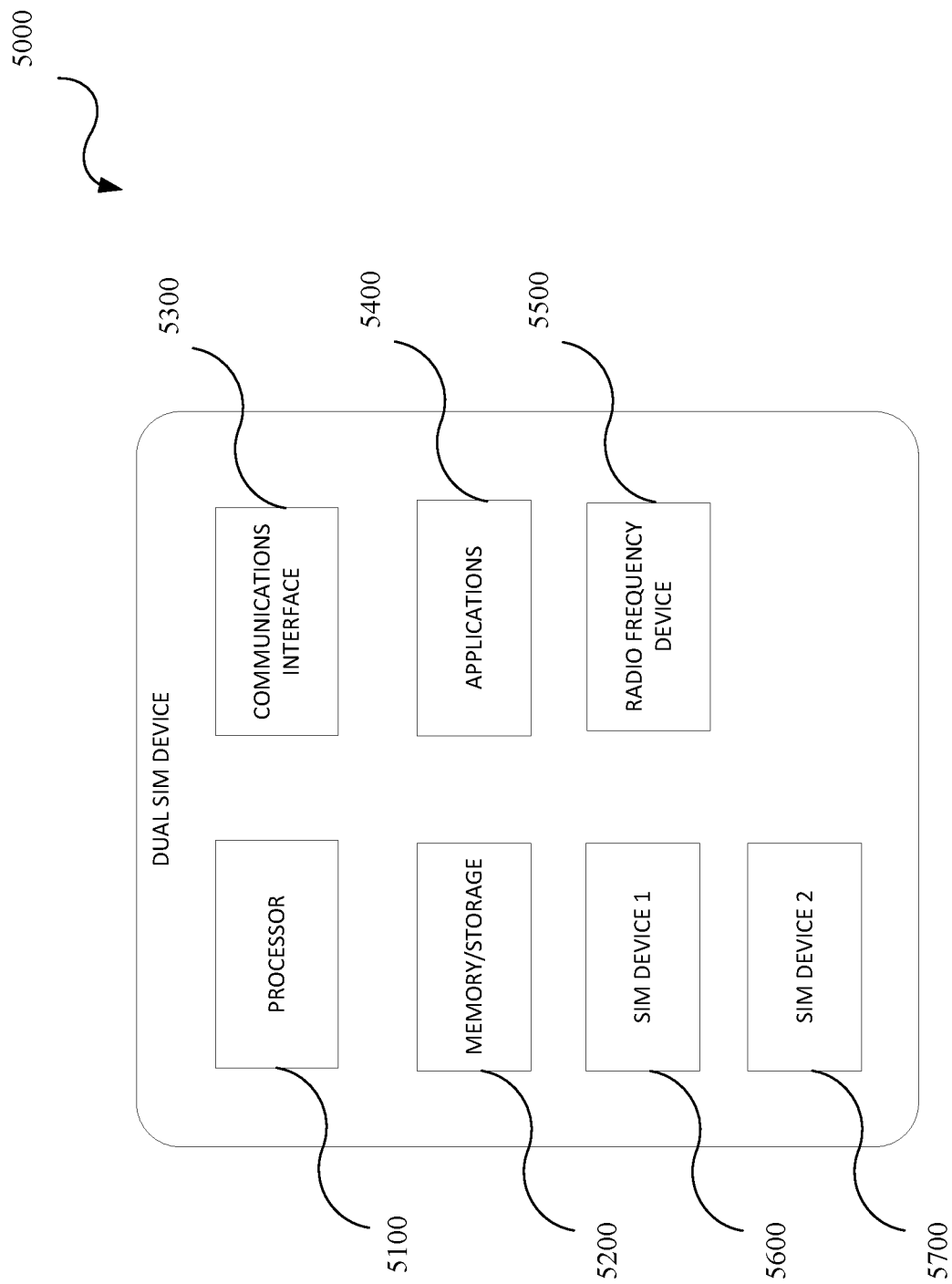
FIG. 5 is a block diagram of an example of a dual SIM device in accordance with embodiments of this disclosure.

FIG. 5 is a block diagram of an example of a device 5000 in accordance with embodiments of this disclosure. The device 5000 may include, but is not limited to, a processor 5100, a memory/storage 5200, a communication interface 5300, applications 5400, a radio frequency device 5500, a first SIM 5600, and a second SIM 5700. The device 5000 may include or implement, for example, the dual SIM devices 1400 and 1500. In an implementation, the memory/storage 5200 may store the PCI table. The applicable or appropriate CBRS network interference management using dual SIM devices techniques or methods described herein may be stored in the memory/storage 5200 and executed by the processor 5100 in cooperation with the memory/storage 5200, the communications interface 5300, the applications 5400, the radio frequency device 5500, the first SIM 5600, and the second SIM 5700 as appropriate. In an implementation, the first SIM 5600 may be provisioned with one MSO, MVNO, or the like, and the second SIM 5700 may be provisioned with another MSO, MVNO, or the like. In an implementation, the first SIM 6600 may be provisioned with a same MSO, MVNO, or the like. In an implementation, the first SIM 5600 and the second SIM 5700 may operate on a time-slotted basis with the radio frequency device 5500. The device 5000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 6:
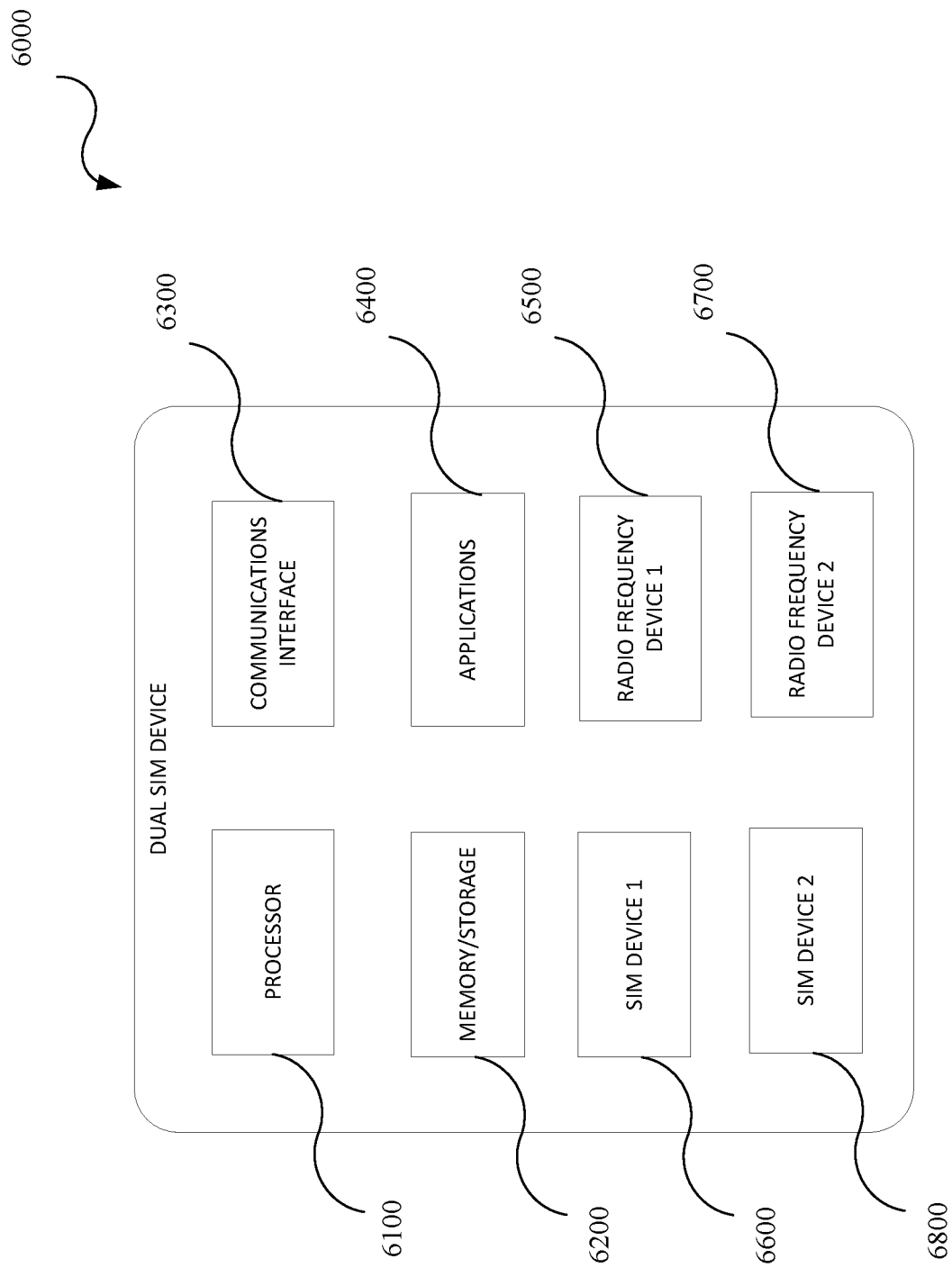
FIG. 6 is a block diagram of an example of another dual SIM device in accordance with embodiments of this disclosure.

FIG. 6 is a block diagram of an example of a device 6000 in accordance with embodiments of this disclosure. The device 6000 may include, but is not limited to, a processor 6100, a memory/storage 6200, a communication interface 6300, applications 6400, a radio frequency device 1 6500, a first SIM 6600, a radio frequency device 2 6700, and a second SIM 6800. The device 6000 may include or implement, for example, the dual SIM devices 1400 and 1500. In an implementation, the memory/storage 6200 may store the PCI table. The applicable or appropriate CBRS network interference management using dual SIM devices techniques or methods described herein may be stored in the memory/storage 6200 and executed by the processor 6100 in cooperation with the memory/storage 6200, the communications interface 6300, the applications 6400, the radio frequency device 1 6500, the first SIM 6600, the radio frequency device 2 6700, and the second SIM 6700 as appropriate. In an implementation, the first SIM 6600 may be provisioned with one MSO, MVNO, or the like, and the second SIM 6700 may be provisioned with another MSO, MVNO, or the like. In an implementation, the first SIM 6600 may be provisioned with a same MSO, MVNO, or the like. In an implementation, the first SIM 6600 may operate with the radio frequency device 1 6500 and the second SIM 6800 may operate with the radio frequency device 2 6700. The device 6000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 7:
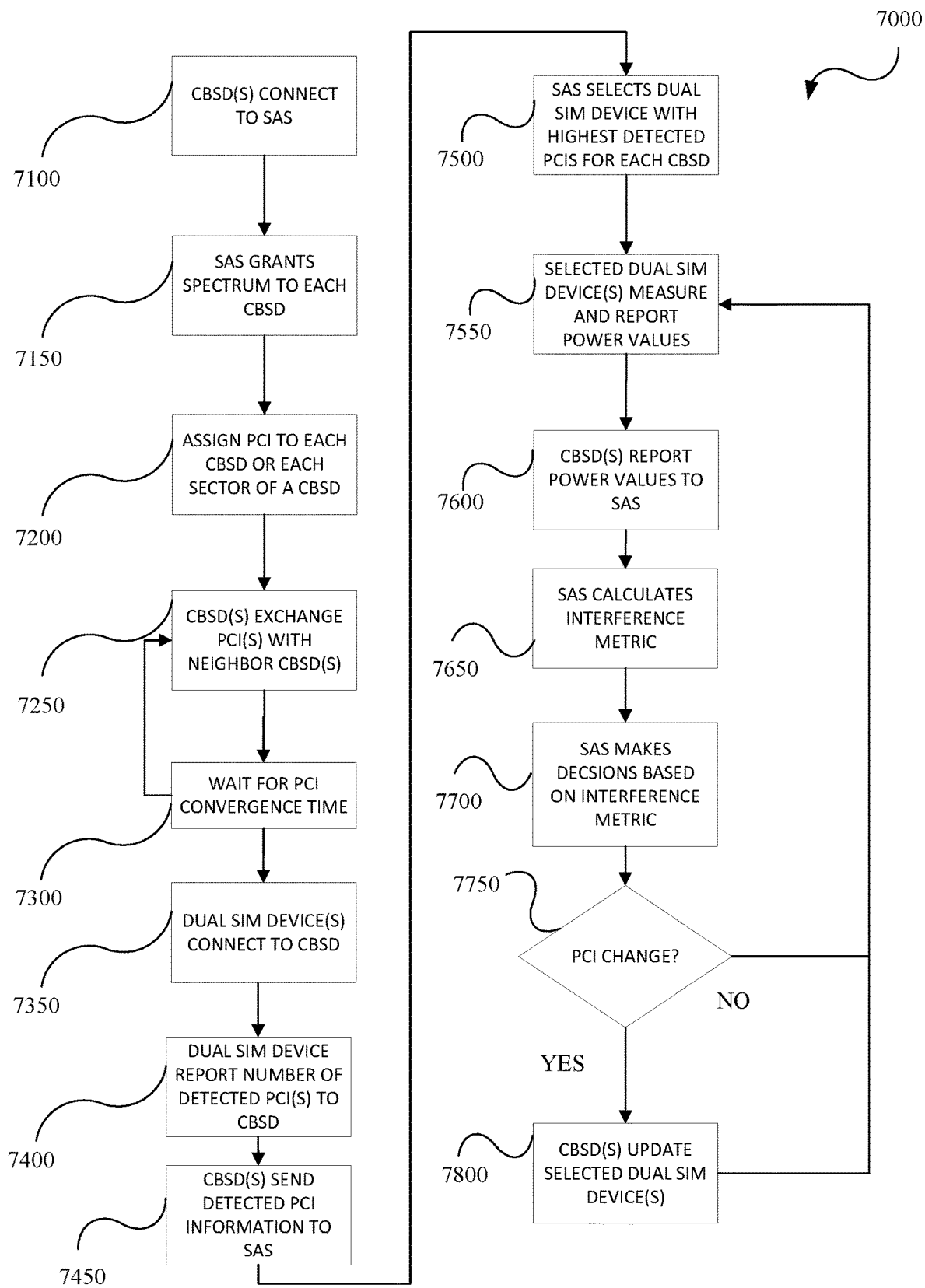
FIG. 7 is a flowchart of an example method for CBRS network interference management using dual SIM devices in accordance with embodiments of this disclosure.

FIG. 7 is a flowchart of an example method 7000 for CBRS network interference management using dual SIM devices in accordance with embodiments of this disclosure. The method 7000 includes: connecting 7100 CBSD(s) to a SAS; granting 7150 CBRS spectrum to each CBSD; assigning 7200 a PCI to each CBSD or CBSD sector; exchanging 7250 PCI(s) with neighbor CBSD(s); waiting 7300 for PCI convergence time; connecting 7350 dual SIM device(s) to a CBSD; reporting 7400 the number of PCI(s) detected to CBSD; sending 7450 the number of detected PCI(s) information to the SAS; selecting 7500 a dual SIM device with highest number of detected PCI(s) for each CBSD; taking 7550 power measurements of certain PCI(s) and reporting same to CBSD; reporting 7600 power values to SAS; determining 7650 interference metric; making 7700 decisions based on determined interference metric; checking 7750 for changes in PCI(s); and updating 7800 selected dual SIM device for changes in PCI(s). For example, the technique 7000 may be implemented, as applicable and appropriate, by a CBSD such as CBSDs 1110, 1120, 1130, 1210, 1220, 1230, and 1240 of FIG. 1, controller 1105 of FIG. 1, controller 1205 of FIG. 1, SAS 1300 of FIG. 1, dual SIM devices such as the dual SIM device 1400 of FIG. 1, the dual SIM device 1500 of FIG. 1, the dual SIM device 5000 of FIG. 5, and the dual SIM device 6000 of FIG. 6, the processor 3100 of FIG. 3, the processor 4100 of FIG. 4, the processor 5100 of FIG. 5, and the processor 6100 of FIG. 6.

The method 7000 includes connecting 7100 CBSD(s) to a SAS. The connecting 7100 may include turning on a CBSD(s) and registering with the SAS. In an implementation, groups of CBSDs may constitute clusters. In an implementation, each cluster may be administered by a controller which interacts or communicates with the SAS on behalf of the cluster. In an implementation, each cluster may be operated by a MSO, MVNO, or other service provider (collectively "service provider"). In an implementation, each cluster may be operated by same or different service providers.

The method 7000 includes granting 7150 CBRS spectrum to each CBSD. A SAS may grant each connected CBSD a portion of the available CBRS spectrum. The SAS may be operated by a party not associated with the service provider(s). The SAS may impose the rules associated with the CBRS spectrum including interference management, spectrum allocation, and spectrum deallocation.

The method 7000 includes assigning 7200 a PCI to each CBSD and/or CBSD sector. Each CBSD may have a number of sectors which provide wireless communications coverage. Assignment of the PCI(s) may use an auto-PCI technique, a self-organizing network (SON) technique, or like techniques.

The method 7000 includes exchanging 7250 PCI(s) with neighbor CBSD(s). Each connected CBSD may exchange PCI(s) with neighbor CBSDs to ensure that overlapping or colliding PCI(s) are not used. Each CBSD generates a PCI table based on exchanged PCI information. In an implementation, neighbor CBSD(s) may be from the same cluster as the CBSD, neighbor CBSD(s) may be from a different cluster as the CBSD, and/or combinations thereof.

The method 7000 includes waiting 7300 for PCI convergence time. The PCI convergence time is a defined time interval which allows the PCIs to achieve a steady state where no overlapping or colliding PCI(s) are used. The time may vary depending on the number of CBSDs involved. During this time, dual SIM devices may not connect to the CBSD. The PCI table may be updated and at end of the PCI convergence time.

The method 7000 includes connecting 7350 dual SIM device(s) to a CBSD. Dual SIM devices entering the wireless communications coverage area of a CBSD, may connect to a CBSD and inform the CBSD that it is a dual SIM device. In an implementation, the dual SIM device may have a first SIM for connecting with the CBSD and a second SIM for taking power measurements. In an implementation, the dual SIM device may have one radio and operate in a time-slotted manner. In an implementation, the dual SIM device may have two radios.

The method 7000 includes reporting 7400 number of PCI(s) detected to CBSD. Each dual SIM device connected to a CBSD may report the number of PCI(s) that is detected by the dual SIM device.

The method 7000 includes sending 7450 the number of detected PCI(s) information to the SAS. Each CBSD connected to a reporting dual SIM device(s) forwards the number of detected PCI(s) to the SAS.

The method 7000 includes selecting 7500 a dual SIM device with highest number of detected PCI(s) for each CBSD. The SAS may inform each CBSD which dual SIM device is to take the power measurements. The selecting 7500 may include each CBSD informing the selected dual SIM device and sending the PCI table to the selected dual SIM device. In an implementation, the SAS may select the dual SIM device using the above metrics and other metrics such as defined times of operation, specific locations, and combinations thereof.

The method 7000 includes taking 7550 power measurements of certain PCI(s) and reporting same to CBSD. The selected dual SIM device uses the unconnected SIM to take power measurements for PCIs which are not listed on the PCI table provided by the CBSD. In an implementation, the selected dual SIM device may take measurements for a defined period of time to conserve battery power. In an implementation, the power measurements may be RSSI, RSRP, RSRQ, and the like.

The method 7000 includes reporting 7600 power values to the SAS. Each CBSD forwards the power measurements to the SAS from the selected dual SIM devices.

The method 7000 includes determining 7650 an interference metric. In an implementation, the interference metric may indicate the level of interference from PCIs outside a cluster associated with the CBSD connected to the dual SIM device. The interference metric may use an average value, a median value, a high value, a low value, or like mathematical function or operator to determine the level of interference. In an implementation, the SAS may create an interference map, or an interference histogram based on the interference metric. In an implementation, the interference metric may indicate the level of interference from PCIs inside a cluster associated with the CBSD connected to the dual SIM device. In an implementation, the interference metric may indicate the level of interference from PCIs outside a cluster associated with the CBSD connected to the dual SIM device, the interference metric may indicate the level of interference from PCIs inside a cluster associated with the CBSD connected to the dual SIM device, and/or combinations thereof.

The method 7000 includes making 7700 decisions based on the determined interference metric. The SAS may make allocation and deallocation decisions with respect to the CBRS spectrum based on the determined interference metric. In an implementation, the SAS may use the interference map, or an interference histogram to make allocation and deallocation decisions.

The method 7000 includes checking 7750 for changes in PCI(s). Each CBSD may check against neighbor CBSDs for changes to the PCI table. The checking 7750 includes the dual SIM device(s) taking additional power measurements with the original PCI table(s) if there are no PCI changes and following the techniques described herein.

The method 7000 includes updating 7800 the selected dual SIM device for changes in PCI(s). Each CBSD may update the PCI table based on changes, additions, deletions, and the like to the CBSDs or CBSD sectors. The updating 7800 includes the dual SIM device(s) taking additional power measurements with the updated PCI table(s) if there are PCI changes and following the techniques described herein.

Figure 8:
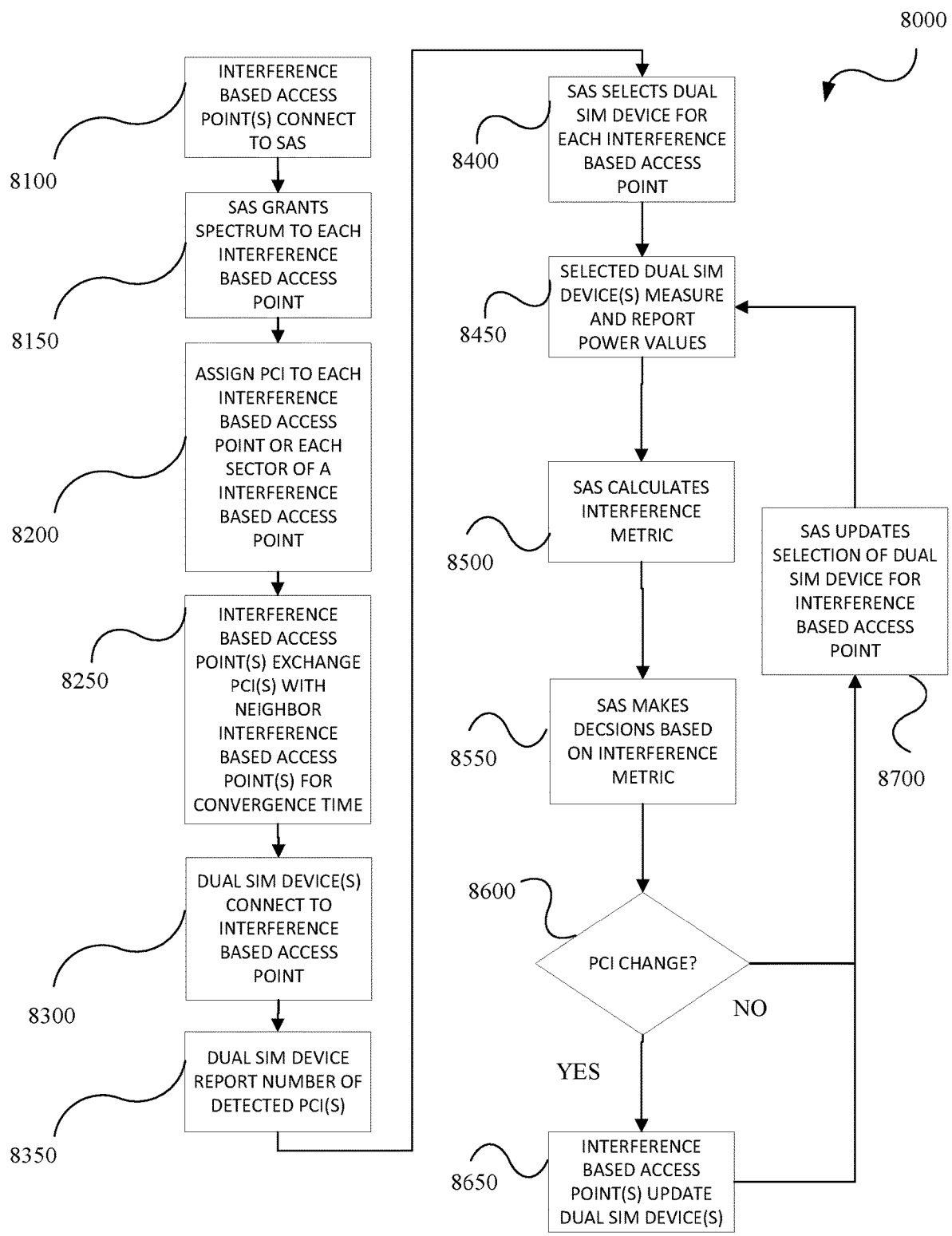
FIG. 8 is a flowchart of an example method for interference spectrum based network interference management using dual SIM devices in accordance with embodiments of this disclosure.

FIG. 8 is a flowchart of an example method 8000 for interference spectrum based network interference management using dual SIM devices in accordance with embodiments of this disclosure. The method 8000 includes: connecting 8100 interference based access point(s) to a SAS; granting 8150 interference based spectrum to each interference based access point; assigning 8200 a PCI to each interference based access point or interference based access point sector; exchanging 8250 PCI(s) with neighbor interference based access point(s) for convergence time; connecting 8300 dual SIM device(s) to an interference based access point; reporting 8350 the number of PCI(s) detected; selecting 8400 a dual SIM device for each interference based access point; taking 8450 power measurements of certain PCI(s) and reporting same; determining 8500 cluster interference metric; making 8550 decisions based on determined cluster interference metric; checking 8600 for changes in PCI(s); updating 8650 selected dual SIM device(s) for changes in PCI(s); and updating 8700 the selection of dual SIM device for each interference based access point. For example, the technique 8000 may be implemented, as applicable and appropriate, by a CBSD such as CBSDs 1110, 1120, 1130, 1210, 1220, 1230, and 1240 of FIG. 1, controller 1105 of FIG. 1, controller 1205 of FIG. 1, SAS 1300 of FIG. 1, dual SIM devices such as the dual SIM device 1400 of FIG. 1, the dual SIM device 1500 of FIG. 1, the dual SIM device 5000 of FIG. 5, and the dual SIM device 6000 of FIG. 6, the processor 3100 of FIG. 3, the processor 4100 of FIG. 4, the processor 5100 of FIG. 5, and the processor 6100 of FIG. 6.

The method 8000 includes connecting 8100 interference based access point(s) to a SAS. The connecting 8100 may include turning on the interference based access point(s) and registering with the SAS. In an implementation, groups of interference based access point(s) may constitute clusters. In an implementation, each cluster may be administered by a controller which interacts or communicates with the SAS on behalf of the cluster. In an implementation, each cluster may be operated by a MSO, MVNO, or other service provider (collectively "service provider"). In an implementation, each cluster may be operated by same or different service providers.

The method 8000 includes granting 8150 interference based spectrum to each interference based access point. A SAS may grant each connected interference based access point a portion of the available interference based spectrum. The SAS may be operated by a party not associated with the service provider(s). The SAS may impose the rules associated with the interference based spectrum including interference management, spectrum allocation, and spectrum deallocation.

The method 8000 includes assigning 8200 a PCI to each interference based access point or interference based access point sector. Each interference based access point may have a number of sectors which provide wireless communications coverage. Assignment of the PCI(s) may use an auto-PCI technique, a self-organizing network (SON) technique, or like techniques.

The method 8000 includes exchanging 8250 PCI(s) with neighbor interference based access point(s) for convergence time. Each connected interference based access point may exchange PCI(s) with neighbor interference based access points to ensure that overlapping or colliding PCI(s) are not used. Each interference based access point generates a PCI table based on exchanged PCI information. The convergence time is a defined time interval which allows the PCIs to achieve a steady state where no overlapping or colliding PCI(s) are used. The time may vary, for example, depending on the number of interference based access points involved in each cluster. During this time, dual SIM devices may not connect to the interference based access point. The PCI table may be updated and at end of the PCI convergence time.

The method 8000 includes connecting 8300 dual SIM device(s) to an interference based access point. Dual SIM devices entering the wireless communications coverage area of an interference based access point, may connect to the interference based access point and inform the interference based access point that it is a dual SIM device. In an implementation, the dual SIM device may have a first SIM for connecting with the interference based access point and a second SIM for taking power measurements. In an implementation, the dual SIM device may have one radio and operate in a time-slotted manner. In an implementation, the dual SIM device may have two radios.

The method 8000 includes reporting 8350 the number of PCI(s) detected. Each dual SIM device connected to an interference based access point may report the number of PCI(s) that is detected by the dual SIM device to the interference based access point. In an implementation, the SIM connected to the interference based access point may be detecting the PCI(s). Each interference based access point may send the number of detected PCI(s) information to the SAS.

The method 8000 includes selecting 8400 a dual SIM device for each interference based access point. In an implementation, the SAS may select the dual SIM device with highest number of detected PCI(s) for each interference based access point. In an implementation, the SAS may select a set of dual SIM devices with the highest number of detected PCI(s) for each interference based access point and rotate through the set to conserve the battery power of the selected set of dual SIM devices. In an implementation, the SAS may select the dual SIM device using the above metrics and other metrics such as defined times of operation, specific locations, and combinations thereof. The SAS may inform each interference based access point which dual SIM device is to take the power measurements. The selecting 8400 may include each interference based access point informing the selected dual SIM device and sending the PCI table to the selected dual SIM device.

The method 8000 includes taking 8450 power measurements of certain PCI(s) and reporting same. The selected dual SIM device uses the unconnected SIM to take power measurements for PCIs which are not listed on the PCI table provided by the interference based access point. In an implementation, the selected dual SIM device may take measurements for a defined period of time to conserve battery power. In an implementation, the power measurements may be RSSI, RSRP, RSRQ, and the like. The taking 8450 includes each interference based access point forwarding the power measurements to the SAS from the selected dual SIM devices.

The method 8000 includes determining 8500 cluster interference metric. The cluster interference metric may indicate the level of interference from PCIs outside a cluster associated with the interference based access point connected to the dual SIM device. The interference metric may use an average value, a median value, a high value, a low value, or like mathematical function or operator to determine the level of interference. In an implementation, the SAS may create an interference map, or an interference histogram based on the interference metric. In an implementation, the cluster interference metric may indicate the level of interference from PCIs inside a cluster associated with the interference based access point connected to the dual SIM device. In an implementation, the cluster interference metric may indicate the level of interference from PCIs outside a cluster associated with the interference based access point connected to the dual SIM device, the cluster interference metric may indicate the level of interference from PCIs inside a cluster associated with the interference based access point connected to the dual SIM device, or combinations thereof.

The method 8000 includes making 8550 decisions based on determined cluster interference metric. The SAS may make allocation and deallocation decisions with respect to the interference based spectrum based on the determined interference metric. In an implementation, the SAS may use the interference map, or an interference histogram to make allocation and deallocation decisions.

The method 8000 includes checking 8600 for changes in PCI(s). Each interference based access point may check against neighbor interference based access points for changes to the PCI table.

The method 8000 includes updating 8650 the selected dual SIM device(s) for changes in PCI(s). Each interference based access point may update the PCI table based on changes, additions, deletions, and the like to the interference based access points or interference based access point sectors.

The method 8000 includes updating 8700 the selection of dual SIM device for each interference based access point. In an implementation, the SAS may select a next highest dual SIM device to conserve battery power of the previous selected dual SIM device. In an implementation, the SAS may rotate through the set of selected dual SIM devices. The updating 8700 includes the selected dual SIM device(s) taking additional power measurements with the original PCI table or with the updated PCI table(s) if there are PCI changes, and following the techniques described herein.

Figure 9:
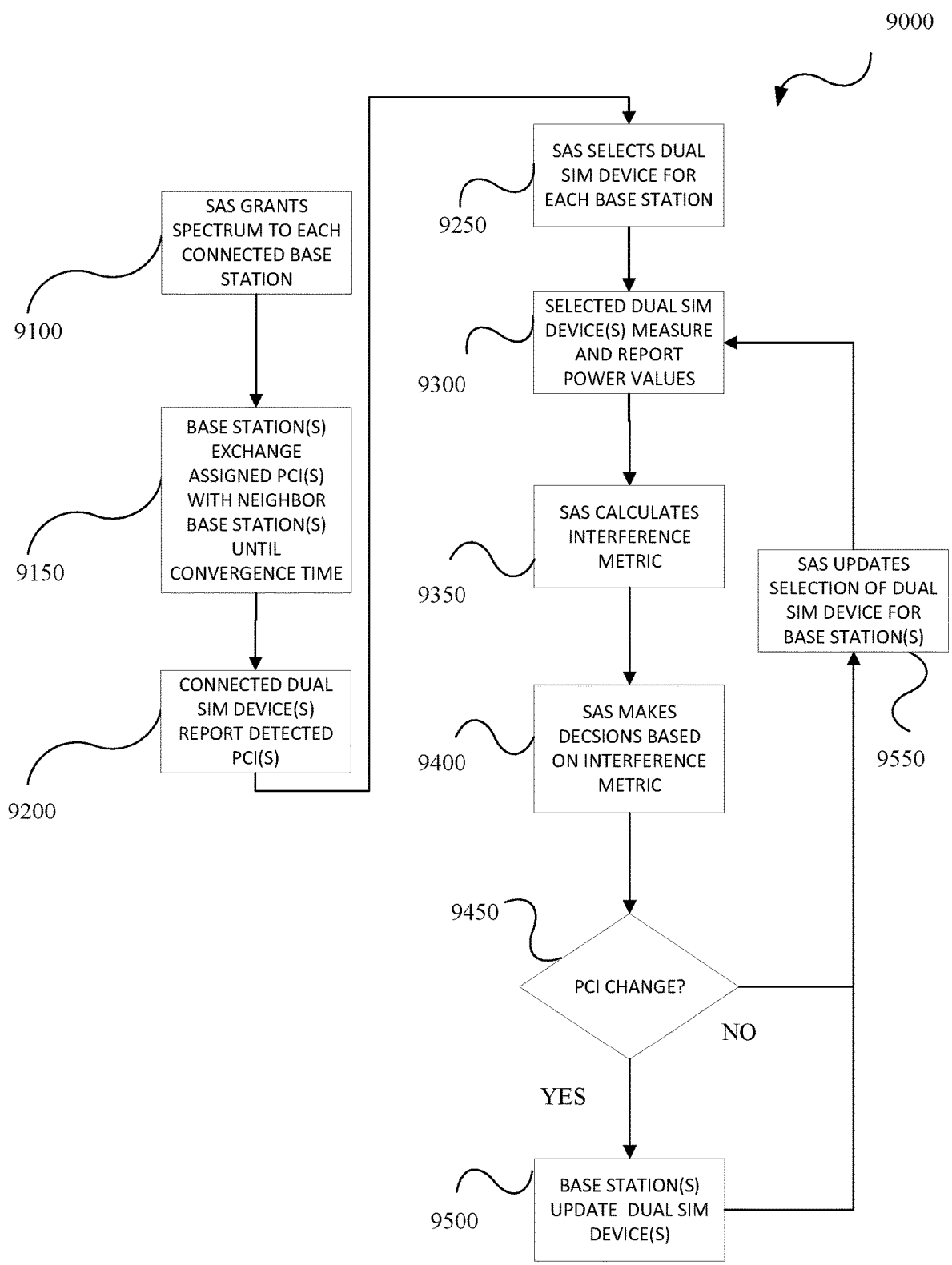
FIG. 9 is a flowchart of an example method for unlicensed spectrum network interference management using dual SIM devices in accordance with embodiments of this disclosure.

FIG. 9 is a flowchart of an example method 9000 for unlicensed spectrum network interference management using dual SIM devices in accordance with embodiments of this disclosure. The method 9000 includes: granting 9100 unlicensed spectrum to each connected base station; exchanging 9150 assigned PCI(s) with neighbor base stations(s) for a convergence time; reporting 9200 the number of PCI(s) detected by each connected dual SIM device; selecting 9250 a dual SIM device for each base station; taking 9300 power measurements of certain PCI(s) and reporting same; determining 9350 cluster interference metric; making 9400 decisions based on determined cluster interference metric; checking 9450 for changes in PCI(s); updating 9500 selected dual SIM device(s) for changes in PCI(s); and updating 9550 the selection of dual SIM device for each base station. For example, the technique 9000 may be implemented, as applicable and appropriate, by a CBSD such as CBSDs 1110, 1120, 1130, 1210, 1220, 1230, and 1240 of FIG. 1, controller 1105 of FIG. 1, controller 1205 of FIG. 1, SAS 1300 of FIG. 1, dual SIM devices such as the dual SIM device 1400 of FIG. 1, the dual SIM device 1500 of FIG. 1, the dual SIM device 5000 of FIG. 5, and the dual SIM device 6000 of FIG. 6, the processor 3100 of FIG. 3, the processor 4100 of FIG. 4, the processor 5100 of FIG. 5, and the processor 6100 of FIG. 6.

The method 9000 includes granting 9100 unlicensed spectrum to each connected base station. The granting 9100 may include turning on, registering, and connecting a base station to a SAS. In an implementation, groups of base station(s) may constitute clusters. In an implementation, each cluster may be administered by a controller which interacts or communicates with the SAS on behalf of the cluster. In an implementation, each cluster may be operated by a MSO, MVNO, or other service provider (collectively "service provider"). In an implementation, each cluster may be operated by same or different service providers. The SAS may grant each connected base station a portion of the available unlicensed spectrum. The SAS may be operated by a party not associated with the service provider(s). The SAS may impose the rules associated with the unlicensed spectrum including interference management, spectrum allocation, and spectrum deallocation.

The method 9000 includes exchanging 9150 assigned PCI(s) with neighbor base stations(s) for a convergence time. The exchanging 9150 includes assigning a PCI to each base station and/or base station sector. Each base station may have a number of sectors which provide wireless communications coverage. Assignment of the PCI(s) may use an auto-PCI technique, a self-organizing network (SON) technique, or like techniques. Each connected base station may exchange PCI(s) with neighbor base stations to ensure that overlapping or colliding PCI(s) are not used. Each base station generates a PCI table based on exchanged PCI information. The convergence time is a defined time interval which allows the PCIs to achieve a steady state where no overlapping or colliding PCI(s) are used. The time may vary, for example, depending on the number of base stations involved in each cluster. During this time, dual SIM devices may not connect to the base station. The PCI table may be updated and at end of the PCI convergence time. In an implementation, the neighbor base stations(s) may be in a same cluster with the base station, the neighbor base stations(s) may be in a different cluster from the base station, and the neighbor base stations(s), and/or combinations thereof.

The method 9000 includes reporting 9200 the number of PCI(s) detected by each connected dual SIM device. The reporting 9200 includes connecting dual SIM device(s) to a base station. Dual SIM devices entering the wireless communications coverage area of a base station may connect to the base station and inform the base station that it is a dual SIM device. In an implementation, the dual SIM device may have a first SIM for connecting with base station and a second SIM for taking power measurements. In an implementation, the dual SIM device may have one radio and operate in a time-slotted manner. In an implementation, the dual SIM device may have two radios. Each dual SIM device connected to a base station may report the number of PCI(s) that is detected by the dual SIM device to the base station. Each base station may send the number of detected PCI(s) information to the SAS.

The method 9000 includes selecting 9250 a dual SIM device for each base station. In an implementation, the SAS may select the dual SIM device with highest number of detected PCI(s) for each base station. In an implementation, the SAS may select a set of dual SIM devices with the highest number of detected PCI(s) for each base station and rotate through the set to conserve the battery power of the selected set of dual SIM devices. In an implementation, the SAS may select the dual SIM device using the above metrics and other metrics such as defined times of operation, specific locations, and combinations thereof. The SAS may inform each base station which dual SIM device is to take the power measurements. The selecting 9250 may include each base station informing the selected dual SIM device and sending the PCI table to the selected dual SIM device.

The method 9000 includes taking 9300 power measurements of certain PCI(s) and reporting same. The selected dual SIM device uses the unconnected SIM to take power measurements for PCIs which are not listed on the PCI table provided by the base station. In an implementation, the selected dual SIM device may take measurements for a defined period of time to conserve battery power. In an implementation, the power measurements may be RSSI, RSRP, RSRQ, and the like. The taking 9300 includes each base station forwarding the power measurements to the SAS from the selected dual SIM devices.

The method 9000 includes determining 9350 cluster interference metric. In an implementation, the cluster interference metric may indicate the level of interference from PCIs outside a cluster associated with the base station connected to the dual SIM device. The interference metric may use an average value, a median value, a high value, a low value, or like mathematical function or operator to determine the level of interference. In an implementation, the SAS may create an interference map, or an interference histogram based on the interference metric. In an implementation, the cluster interference metric may indicate the level of interference from PCIs inside a cluster associated with the base station connected to the dual SIM device. In an implementation, the cluster interference metric may indicate the level of interference from PCIs outside a cluster associated with the base station connected to the dual SIM device, the cluster interference metric may indicate the level of interference from PCIs inside a cluster associated with the base station connected to the dual SIM device, or combinations thereof.

The method 9000 includes making 9400 decisions based on determined cluster interference metric. The SAS may make allocation and deallocation decisions with respect to the unlicensed spectrum based on the determined interference metric. In an implementation, the SAS may use the interference map, or an interference histogram to make allocation and deallocation decisions.

The method 9000 includes checking 9450 for changes in PCI(s). Each base station may check against neighbor base station for changes to the PCI table.

The method 9000 includes updating 9500 selected dual SIM device(s) for changes in PCI(s). Each base station may update the PCI table based on changes, additions, deletions, and the like to the base stations or base station sectors.

The method 9000 includes updating 9550 the selection of dual SIM device for each base station. In an implementation, the SAS may select a next highest dual SIM device to conserve battery power of the previous selected dual SIM device. In an implementation, the SAS may rotate through the set of selected dual SIM devices. The updating 9550 includes the selected dual SIM device(s) taking additional power measurements with the original PCI table or with the updated PCI table(s) if there are PCI changes, and following the techniques described herein.

In general, a method for measuring network interference using dual subscriber identification module (SIM) devices includes assigning a physical cell identity (PCI) to each connected Citizens Broadband Radio Service (CBRS) device (CBSD) granted unlicensed spectrum by a spectrum access system (SAS), where multiple clusters are formed containing different spectrum granted CBSDs. Each spectrum granted CBSD exchanges PCIs with neighbor spectrum granted CBSDs, where each spectrum granted CBSD maintains a PCI table. A first SIM device in a dual SIM device connects to a spectrum granted CBSD after convergence of PCI tables. The number of PCIs detected by the dual SIM device is reported to the SAS by each spectrum granted CBSD having a connected dual SIM device. Each SAS designated dual SIM device measures using a second SIM device, power values of PCIs detected by the designated dual SIM device which are absent from the PCI table provided by an associated spectrum granted CBSD. The measured power values are reported to the SAS. Cluster interference decisions are made based on the measured power values and reported. In an implementation, CBSDs connect and register to the SAS. PCIs are assigned to each CBSD and CBSD sector. In an implementation, a convergence interval is waited for the PCIs to achieve a steady state where overlapping or colliding PCI(s) are prevented. In an implementation, each dual SIM device informs a CBSD that the dual SIM device is a dual SIM device. In an implementation, each associated spectrum granted CBSD having a connected dual SIM device reports a number of PCIs detected by the dual SIM device. In an implementation, each SAS designated dual SIM device is dual SIM device which detected greatest number of PCIs. In an implementation, each SAS designated dual SIM device is based on least one of dual SIM device which detected greatest number of PCIs, dual SIM device times of operation, and dual SIM device location. In an implementation, each SAS designated dual SIM device takes the power measurements for a defined period of time.

In general, a method for measuring network interference using dual subscriber identification module (SIM) devices includes generating, by each shared spectrum interference based device, a physical cell identity (PCI) table by exchanging PCIs with neighbor shared spectrum interference based devices for a defined period of time to resolve non-overlapping PCI usage. Each shared spectrum interference based device having at least one connected dual SIM device reports to a spectrum access system (SAS) a number of PCIs detected by the at least one dual SIM device. Each shared spectrum interference based device having the at least one connected dual SIM device shares a PCI table with a selected dual SIM device. Each selected dual SIM device using another SIM device measures power values of PCIs detected by each selected dual SIM device which are missing from the shared PCI table. Spectrum interference decisions based on the measured power values are made. In an implementation, PCIs are assigned to each shared spectrum interference based device and each sector of each shared spectrum interference based device. In an implementation, each dual SIM device informs a dual SIM device status to an associated shared spectrum interference based device. In an implementation, for each shared spectrum interference based device, a set of dual SIM devices having highest number of detected PCIs is selected. In an implementation, one of the set of dual SIM devices is selected to take power measurements for a designated period of time. In an implementation, another one of the set of dual SIM devices is selected to take power measurements for a designated period of time after the one dual SIM device has reported power measurements. In an implementation, a selection is further based on least one of dual SIM device times of operation and dual SIM device location.

In general, a system for measuring network interference using dual subscriber identification module (SIM) devices includes a plurality of Citizens Broadband Radio Service (CBRS) devices (CBSDs) forming a first cluster, wherein each CBSD and CBSD sector have a physical cell identity (PCIs) which are exchanged between neighboring CBSDs within the first cluster to yield unique PCIs for each CBSD and CBSD sector, and another plurality of Citizens Broadband Radio Service (CBRS) devices (CBSDs) forming a second cluster, wherein each CBSD and CBSD sector have a physical cell identity (PCIs) which are exchanged between neighboring CBSDs within the second cluster to yield unique PCIs for each CBSD and CBSD sector, and where the first cluster and the second cluster have non-overlapping CBSDs. The system further includes a spectrum access system (SAS) configured to grant unlicensed spectrum to the plurality of CBSDs and the another plurality of CBSDs. The system further includes a dual SIM device configured to connect via a first SIM to a CBSD in one of the first cluster or the second cluster and report a number of detected PCIs, and a selected dual SIM device configured to take power measurements, via a second SIM, of PCIs detected by the selected dual SIM device which are in one of the first cluster or the second cluster unassociated with the CBSD, and where the selected dual SIM device is selected from the at least one dual SIM device. The SAS configured to make inter-cluster and intra-cluster interference decisions based on received power measurements from the selected dual SIM device. In an implementation, the CBSD is configured to share a PCI table with the selected dual SIM device. In an implementation, the selected dual SIM device is dual SIM device which detected greatest number of PCIs. In an implementation, the selected dual SIM device is based on least one of dual SIM device which detected greatest number of PCIs, dual SIM device times of operation, and dual SIM device location. In an implementation, each selected dual SIM device takes the power measurements for a defined period of time.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for measuring network interference using dual subscriber identification module (SIM) devices, the method comprising:
    assigning a physical cell identity (PCI) to each connected Citizens Broadband Radio Service (CBRS) device (CBSD) granted unlicensed spectrum by a spectrum access system (SAS), wherein multiple clusters are formed containing different spectrum granted CBSDs;
    exchanging, by each spectrum granted CBSD with neighbor spectrum granted CBSDs, the PCIs, wherein each spectrum granted CBSD maintains a PCI table;
    connecting, via first SIM devices in dual SIM devices, to a spectrum granted CBSD after convergence of PCI tables;
    reporting, to the SAS by each spectrum granted CBSD having connected dual SIM devices, a number of PCIs detected by each of the dual SIM devices using their respective first SIM devices;
    measuring, by each SAS designated dual SIM device using their respective second SIM device, power values of PCIs detected by the SAS designated dual SIM device which are absent from the PCI table provided by an associated spectrum granted CBSD, wherein the each SAS designated dual SIM device is one of the connected dual SIM devices which reported the number of PCIs detected using their respective first devices;
    reporting, to the SAS by each SAS designated dual SIM device via an associated spectrum granted CBSD, the measured power values; and
    receiving, from the SAS by each spectrum granted CBSD, cluster interference decisions based on the measured power values.

2. The method of claim 1, the method further comprising: connecting and registering, by CBSDs, to the SAS.

3. The method of claim 2, the method further comprising: assigning PCIs to each CBSD and CBSD sector.

4. The method of claim 3, the method further comprising: waiting for a convergence interval for the PCIs to achieve a steady state where overlapping or colliding PCI(s) are prevented.

5. The method of claim 4, the method further comprising: informing, to a CBSD by each dual SIM device, that the dual SIM device is a dual SIM device.

6. The method of claim 5, the method further comprising:
reporting, to each associated spectrum granted CBSD having a connected dual SIM device, a number of PCIs detected by the dual SIM device.

7. The method of claim 1, wherein each SAS designated dual SIM device is a dual SIM device which detected a greater number of PCIs than other dual SIM devices reporting to a same associated spectrum granted CBSD.

8. The method of claim 1, wherein each SAS designated dual SIM device is based on least one of dual SIM device which detected a greater number of PCIs than other dual SIM devices reporting to a same associated spectrum granted CBSD, dual SIM device times of operation, and dual SIM device location.

9. The method of claim 1, wherein each SAS designated dual SIM device takes the power measurements for a defined period of time.

10. A method for measuring network interference using dual subscriber identification module (SIM) devices, the method comprising:
generating, by each shared spectrum interference based device, a physical cell identity (PCI) table by exchanging PCIs with neighbor shared spectrum interference based devices for a defined period of time to resolve non-overlapping PCI usage;
reporting, to a spectrum access system (SAS) by each shared spectrum interference based device having at least one connected dual SIM device, a number of PCIs detected by the at least one dual SIM device using a SIM device;
sharing, by each shared spectrum interference based device having the at least one connected dual SIM device, a PCI table with a selected dual SIM device;
measuring, by each selected dual SIM device using another SIM device, power values of PCIs detected by each selected dual SIM device which are missing from the shared PCI table; and
making spectrum interference decisions, by the SAS, based on the measured power values.

11. The method of claim 10, the method further comprising:
assigning PCIs to each shared spectrum interference based device and each sector of each shared spectrum interference based device.

12. The method of claim 10, the method further comprising:
informing, by each dual SIM device, a dual SIM device status to an associated shared spectrum interference based device.

13. The method of claim 10, the method further comprising:
selecting, for each shared spectrum interference based device, a set of dual SIM devices having highest number of detected PCIs; and
selecting one of the set of dual SIM devices to take power measurements for a designated period of time.

14. The method of claim 13, the method further comprising:
selecting another one of the set of dual SIM devices to take power measurements for a designated period of time after the one dual SIM device has reported power measurements.

15. The method of claim 13, wherein a selection is further based on least one of dual SIM device times of operation and dual SIM device location.

16. A system for measuring network interference using dual subscriber identification module (SIM) devices, the system comprising:
a plurality of Citizens Broadband Radio Service (CBRS) devices (CBSDs) forming a first cluster, wherein each CBSD and CBSD sector have a physical cell identity (PCIs) which are exchanged between neighboring CBSDs within the first cluster to yield unique PCIs for each CBSD and CBSD sector;
another plurality of Citizens Broadband Radio Service (CBRS) devices (CBSDs) forming a second cluster, wherein each CBSD and CBSD sector have a physical cell identity (PCIs) which are exchanged between neighboring CBSDs within the second cluster to yield unique PCIs for each CBSD and CBSD sector, and wherein the first cluster and the second cluster have non-overlapping CB SDs;
a spectrum access system (SAS) configured to grant unlicensed spectrum to the plurality of CBSDs and the another plurality of CBSDs;
at least one dual SIM device configured to connect via a first SIM to a CBSD in one of the first cluster or the second cluster and report a number of detected PCIs using the first SIM;
a selected dual SIM device configured to take power measurements, via a second SIM, of PCIs detected by the selected dual SIM device which are in one of the first cluster or the second cluster unassociated with the CBSD and are missing from a PCI table shared by the CBSD, and wherein the selected dual SIM device is selected from the at least one dual SIM device by the SAS; and
the SAS configured to make inter-cluster interference decisions based on received power measurements from the selected dual SIM device using the second SIM.

17. The system of claim 16, wherein the CBSD is configured to share a PCI table with the selected dual SIM device.

18. The system of claim 16, wherein the selected dual SIM device is a dual SIM device which detected a greater number of PCIs than other dual SIM devices connected to a same CBSD.

19. The system of claim 16, wherein the selected dual SIM device is based on least one of dual SIM device which detected greatest number of PCIs, dual SIM device times of operation, and dual SIM device location.

20. The system of claim 16, wherein each selected dual SIM device takes the power measurements for a defined period of time.

* * * * *

UNITED STATES PATENT AND TRADEMARK OFFICE
CERTIFICATE OF CORRECTION

PATENT NO. : 11,115,845 B2
APPLICATION NO. : 16/439795
DATED : September 7, 2021
INVENTOR(S) : Volkan Sevindik and Haider Syed It is certified that error appears in the above-identified patent and that said Letters Patent is hereby corrected as shown below:

In the Claims

At Column 20, Claim number 1, Line number 27, after "each" insert --of a--; and

At Column 21, Claim number 10, Line number 22, after "each" insert --of a--.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*